(12) United States Patent
Chae et al.

(10) Patent No.: US 8,395,824 B2
(45) Date of Patent: Mar. 12, 2013

(54) METHOD FOR DETERMINING GROUND LINE

(75) Inventors: Sun Hyuck Chae, Suwon-si (KR); Do Kyoon Kim, Seongnam-si (KR); Kee Chang Lee, Yongin-si (KR); Hwa Sup Lim, Hwaseong-si (KR); Anton Sergeevich Konushin, Moscow (RU); Olga Vyacheslavovna Barinova, Moscow (RU); Vadim Sergeevich Konushin, Moscow (RU); Anton Anatolyevich Yakubenko, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 792 days.

(21) Appl. No.: 12/458,600

(22) Filed: Jul. 16, 2009

(65) Prior Publication Data

US 2010/0014716 A1    Jan. 21, 2010

(30) Foreign Application Priority Data

Jul. 17, 2008   (RU) ................................ 2008132273
Oct. 28, 2008   (KR) ........................ 10-2008-0105977

(51) Int. Cl.
*G06K 9/00*        (2006.01)
(52) U.S. Cl. ........................................ 358/113; 382/202
(58) Field of Classification Search .................. 382/113, 382/202
See application file for complete search history.

(56) References Cited

U.S. PATENT DOCUMENTS 6,975,758 B2 * 12/2005 Nicolas .......................... 382/165
2008/0117296 A1 * 5/2008 Egnal et al. .................... 348/143

OTHER PUBLICATIONS

Zhang et al., "Hierarchical Buidling Recognition," Feb. 8, 2006, Elsevoer Science.*

* cited by examiner

*Primary Examiner* — John Strege
(74) *Attorney, Agent, or Firm* — Staas & Halsey LLP (57) ABSTRACT

A method of determining a ground line from an input image. The method includes determining a plurality of ground line candidates from the image, determining a certain band a central-line of which is a boundary between a G region and other regions in a Ground Building Sky (GBS) map of the image, and determining the ground line of the image by selecting a ground line candidate, among the plurality of ground line candidates, having the greatest extent crossing the certain band.

13 Claims, 14 Drawing Sheets

METHOD FOR DETERMINING GROUND LINE

CROSS-REFERENCE TO RELATED APPLICATIONS

This application claims the benefit of Russian Patent Application No. 2008132273, filed on Jul. 17, 2008 in the Russian Patent Office and Korean Patent Application No. 10-2008-0105977, filed on Oct. 28, 2008, in the Korean Intellectual Property Office, the entire disclosures of which are incorporated herein by reference.

BACKGROUND

1. Field

One or more embodiments relate to an image processing method, and more particularly, to determining a ground line that is a boundary line between a building region and a ground region in an image.

2. Description of the Related Art

Currently, research is being conducted regarding three-dimensional (3D) image modeling from a color image. One advantageous technique being researched is an image processing technique that performs segmenting a ground region, a building region, and sky region from the image and determines a ground line that is a boundary line between a building region and a ground region.

If the ground line can be determined, 3D image modeling is possible by cutting an image around the ground line and setting up the same as a vertical structure. The image modeling is applicable to a Motion Pictures Experts Group 4 (MPEG-4) encoding method based on objects. Specifically, with respect to a method for restoring a 3D image from a 2D image of a city where artificial structures exist, the method for determining the ground line may significantly affect efficiency of image processing.

SUMMARY

An aspect of one or more embodiments, contrived for 3D image modeling, provides a method and apparatus for determining a ground line between a building and ground in an image.

Another aspect of one or more embodiments also provides a method and apparatus for automatically determining a ground line in an inputted 2D image.

Another aspect of one or more embodiments also provides a method and apparatus for effectively determining a ground line in an image where a plurality of buildings exist.

According to an aspect of one or more embodiments, there is provided a method of determining a ground line of an image, including determining a plurality of ground line candidates from the image, determining a certain band having a central-line being a boundary between a ground (G) region and other regions in a Ground Building Sky (GBS) map of the image, and determining the ground line of the image by selecting a ground line candidate, among the plurality of ground line candidates, having the greatest number of point lying within the certain band.

In an aspect of one or more embodiments, the method further includes detecting a plurality of horizontal straight lines belonging to a B region of the image, and determining the plurality of ground line candidates using the plurality of horizontal straight lines.

In an aspect of one or more embodiments, the method of detecting the plurality of horizontal straight lines belonging to a B region of the image includes extracting a plurality of straight lines from the image, detecting a plurality of horizontal straight lines from among the plurality of straight lines, and selecting the plurality of horizontal straight lines belonging to the B region from among the plurality of horizontal straight lines.

In an aspect of one or more embodiments, the method of detecting a plurality of horizontal straight lines from among the plurality of straight lines includes comparing the B region in the GBS map of the image with the plurality of horizontal straight lines, and selecting the plurality of horizontal straight lines belonging to the B region, based on the comparing.

In an aspect of one or more embodiments, the method further includes clustering the plurality of horizontal straight lines into a plurality of groups, and the determining of the plurality of ground line candidates may be based on the clustered plurality of horizontal straight lines.

In an aspect of one or more embodiments, the method further includes determining a vanishing point of each of the plurality of groups, determining a vertical boundary line between the plurality of groups, and detecting a straight line that passes through a plurality of points of the vertical boundary line and the vanishing point of each of the plurality of groups.

In an aspect of one or more embodiments, the determining of the ground line of the image includes determining a certain band having a central-line of which is a boundary between a G region and other regions in the GBS map of the image, and determining the ground line of the image depending on to what degree each of the plurality of ground line candidates is within the certain band.

According to another aspect of one or more embodiments, there is provided a method of determining a ground line, including extracting a plurality of straight lines from an image, determining a plurality of ground line candidates using a vanishing point of the plurality of straight lines, and determining a ground line of the image from among the plurality of ground lines using a GBS map of the image.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

Figure 1:
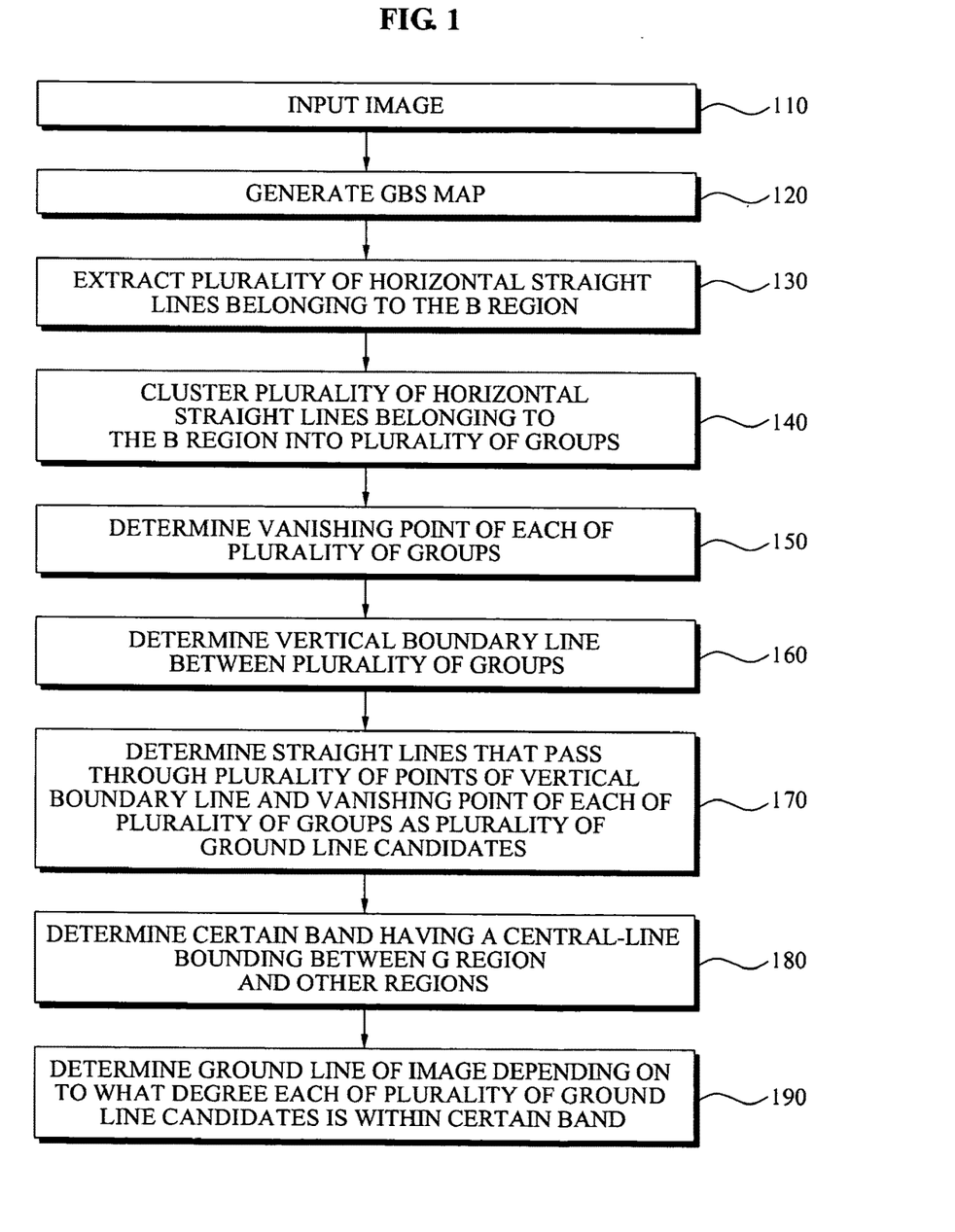
FIG. 1 illustrates a flowchart of a method for determining a ground line of an image according to an embodiment of the present invention.

FIG. 1 illustrates a flowchart of a method for determining a ground line of an image according to an embodiment of the present invention;

In operation 110, an image is inputted. According to embodiments of the present invention, the image is an image file comprised of RGB data. A file format of the color image may be in a variety of types, such as a bitmap (.bmp file), Joint Photographic Experts Group (.jpeg, .jpg files), and raw file formats. When the file format is in a data-compressed format, decompression may be performed before a start of the image processing.

According to one or more embodiments, accuracy and/or efficiency of image processing increases through a variety of pre-processing of the input image. For example, a value (or a brightness) or a contrast of the input image is adjusted, and the adjusted resulting image can be an input image for the image processing. Also, the pre-processing may include a variety of filter mask processes.

In operation 120, a Ground Building Sky (GBS) map of the input image is generated. The GBS map shows an image that is simply segmented into substantial portions, namely, a ground region, building region, and sky region. To generate the GBS map, information, such as a color, location, texture, and the like, is learned from a plurality of images where the above mentioned regions exist. Then, when a new image is given, the new image is segmented into each region using the learned information, and thereby can generate a GBS map of the new image.

In operation 130, a plurality of horizontal straight lines belonging to the building region are extracted. According to embodiments of the present invention, a plurality of straight lines are extracted from an input image using a Sobel Edge Detector. A plurality of horizontal straight lines are extracted from among the plurality of straight lines, and non-horizontal straight lines are filtered out. Also, the GBS map of the input image and the plurality of horizontal straight lines are compared. A plurality of horizontal straight lines corresponding to a G region and S region of the GBS map from among the plurality of horizontal straight lines are filtered out, and thus the plurality of horizontal straight lines belonging to the B region are extracted.

In operation 140, the plurality of horizontal straight lines belonging to the B region are clustered into a plurality of groups. According to embodiments of the present invention, x coordinates of the plurality of horizontal straight lines belonging to the B region are clustered into a middle-phase group using a mean shift algorithm. Then, an outlier of each of the middle-phase groups is eliminated using a Random Sample Consensus (RANSAC) algorithm. A main direction of each of the middle-phase groups is calculated and another clustering using the mean shift algorithm is performed, and thus, a plurality of groups in a bigger unit are generated by merging similar main directions of the middle-phase groups.

In operation 150, a vanishing point of each of the plurality of groups is determined. A plurality of vanishing points is extracted from a plurality of straight lines in the plurality of groups. In this instance, a vanishing point of an outlier which is not eliminated from the plurality of groups may be extracted. The vanishing point of the outlier is eliminated and the plurality of vanishing points of an inlier are averaged, and thus a number of final vanishing points are extracted. According to one or more embodiments, the number of final vanishing points is equal to or less than a number of the groups, because although one vanishing point is extracted in each group, a group which may be comprised of only parallel straight lines would not have a vanishing point.

In operation 160, a vertical boundary line between the plurality of groups is determined. According to one or more embodiments, 10% of a portion of edges of each of the plurality of groups are selected, and the longest vertical straight line within an edge region between neighboring groups is determined as the boundary line between the plurality of groups. The vertical boundary line is a point where the ground line curves.

In operation 170, straight lines that pass through a plurality of points of the vertical boundary line and a vanishing point of each of the plurality of groups are determined as a plurality of ground line candidates. For example, a straight line that passes through each pixel of the vertical boundary line and a vanishing point of each of the plurality of groups is determined as a ground line candidate. The ground line candidate in a group with no vanishing point becomes a straight line parallel to a horizon.

In operation 180, a certain band having a central-line being a boundary between a G region and other regions is determined. According to one or more embodiments, pixels that are added, either in a positive or negative y coordinate direction to each pixel of the vertical boundary line are determined as the certain band.

In operation 190, a ground line of the image is determined depending on to what degree each of the plurality of ground line candidates is within the certain band. The ground line candidates are compared with the certain band and then a candidate which is most within the certain band is determined as a ground line of the image from among the plurality of ground line candidates. According to an embodiment of the present invention, a number of pixels, of each of the plurality of ground line candidates, that cross the certain band is calculated, and a ground line candidate that has the greatest number of pixels that cross the certain band, is selected as the ground line of the image.

Figure 2:
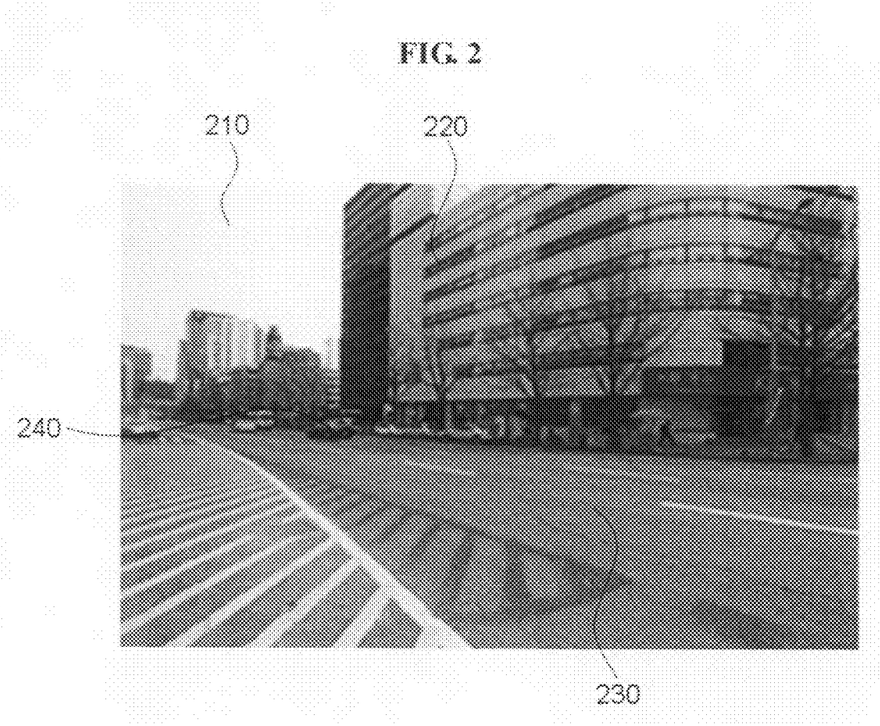
FIG. 2 illustrates an example of an inputted image according to an embodiment of the present invention.

FIG. 2 illustrates an image inputted according to an embodiment of the present invention. A region 210 corresponds to a Sky (S) region, a region 220 corresponds to a Building (B) region, and a region 230 corresponds to a Ground (G) region. Each of the regions has a boundary between the regions. A car 240 in the input image is located in a boundary between the B region 220 and the G region 230. Therefore, the car 240 and the like is a factor that causes an error in a ground line of a GBS map through simple image segmentation.

Figure 3:
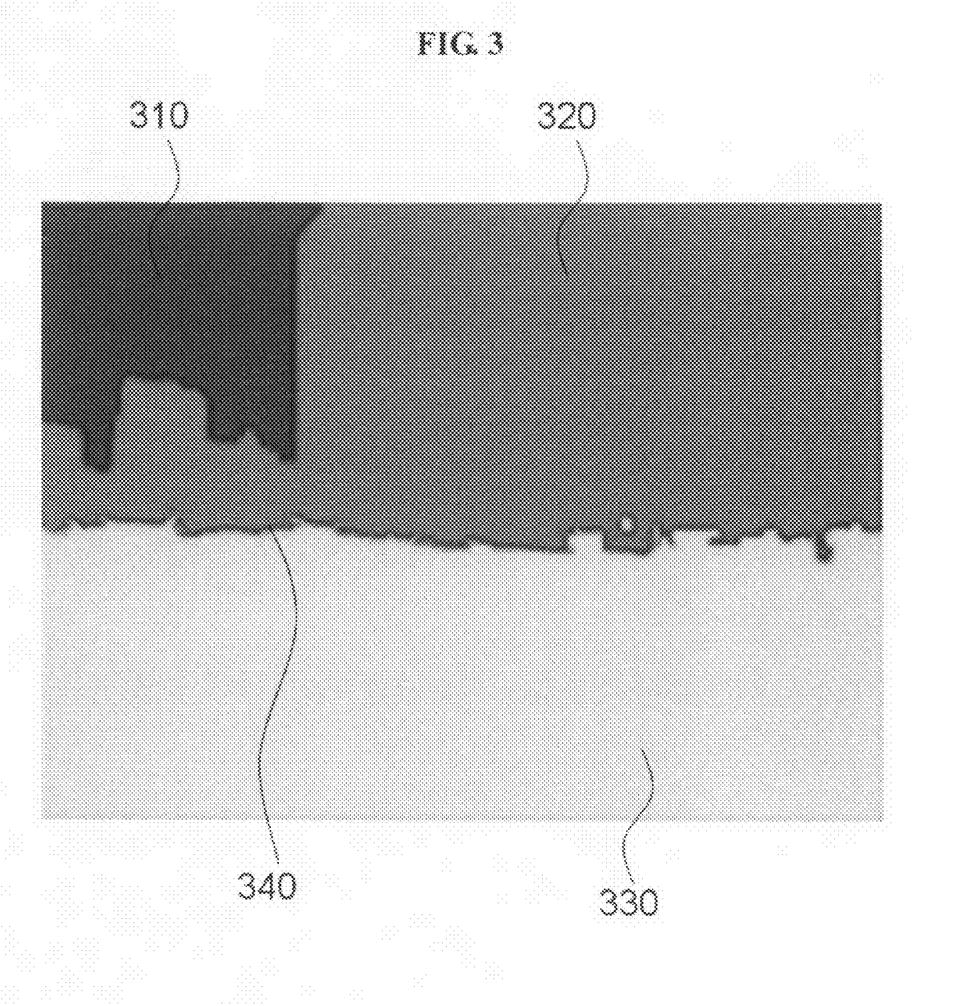
FIG. 3 illustrates an example of a Ground Building Sky (GBS) map image extracted from an inputted image, for example, the inputted image of FIG. 2, according to an embodiment of the present invention.

FIG. 3 illustrates an example of a GBS map image extracted from an input image, for example, the input image of FIG. 2 according to an embodiment of the present invention. A region 310 corresponds to an S region, a region 320 corresponds to a B region, a region 330 corresponds to a G region. A boundary 340 is a boundary between the G region and other regions. The boundary 340 is not a straight line in the example image. According to an embodiment, a certain band having a central-line of which is the boundary 340 is determined, a ground line of the input image is determined depending on to what degree each of the plurality of ground line candidates is within the certain band.

Figure 4:
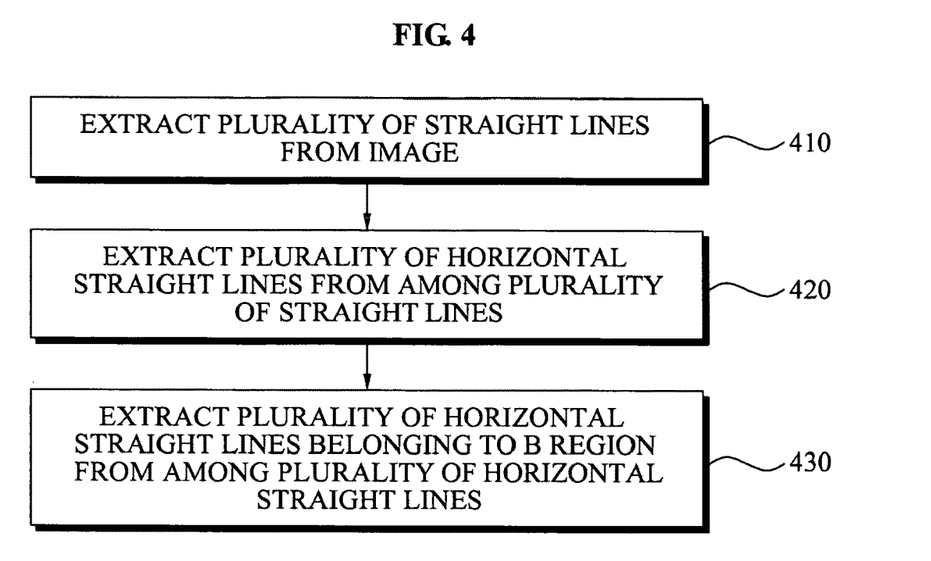
FIG. 4 illustrates a flowchart of a process of extracting a plurality of horizontal straight lines belonging to a building region from among a plurality of horizontal straight lines according to an embodiment of the present invention.

FIG. 4 illustrates a flowchart of a process of extracting a plurality of horizontal straight lines belonging to a B region from among a plurality of horizontal straight lines, according to an embodiment of the present invention.

In operation 410, a plurality of straight lines are extracted from an input image. According to an embodiment, the plurality straight lines may be extracted using a Sobel Edge Detector. An operator mask for the x and y axes of the Sobel Edge Detector is shown below, for example, in Equation 1.

$$G_x = \begin{bmatrix} +1 & 0 & -1 \\ +2 & 0 & -2 \\ +1 & 0 & -1 \end{bmatrix} * A \text{ and } G_y = \begin{bmatrix} +1 & +2 & +1 \\ 0 & 0 & 0 \\ -1 & -2 & -1 \end{bmatrix} * A. \quad \text{Equation 1}$$

Here, the Gx indicates a Sobel X gradient map, Gy indicates a Sobel Y gradient map. The A indicates a data of the image. The matrix [1, 0, −1; 2, 0, −2; 1, 0, −1] corresponds to a mask of an X axis, and the matrix [1, 2, 1; 0, 0, 0; −1, −2, −1] corresponds to a mask of a Y axis.

In operation 420, a plurality of horizontal straight lines are extracted from among the plurality of straight lines. Following operation 410, non-horizontal straight lines are filtered out from among the extracted plurality of straight lines, and thus the plurality of horizontal straight lines are extracted.

According to one or more embodiments, in operations 410 and 420, a Sobel operator of a Y axis may be applied to the image to generate a Sobel gradient image, and thus a plurality of horizontal edges are extracted and a plurality of straight lines are extracted from the horizontal edges.

In operation 430, a plurality of horizontal straight lines belonging to a B region are extracted from among the plurality of horizontal straight lines. For example, a GBS map of FIG. 3 is compared with the plurality of horizontal straight lines. Portions corresponding to a G region and B region of the GBS map are filtered out from the plurality of horizontal straight lines. Therefore, only portions corresponding to the B region of the GBS map remain, and thus the plurality of horizontal straight lines belonging to the B region are extracted.

Figure 5:
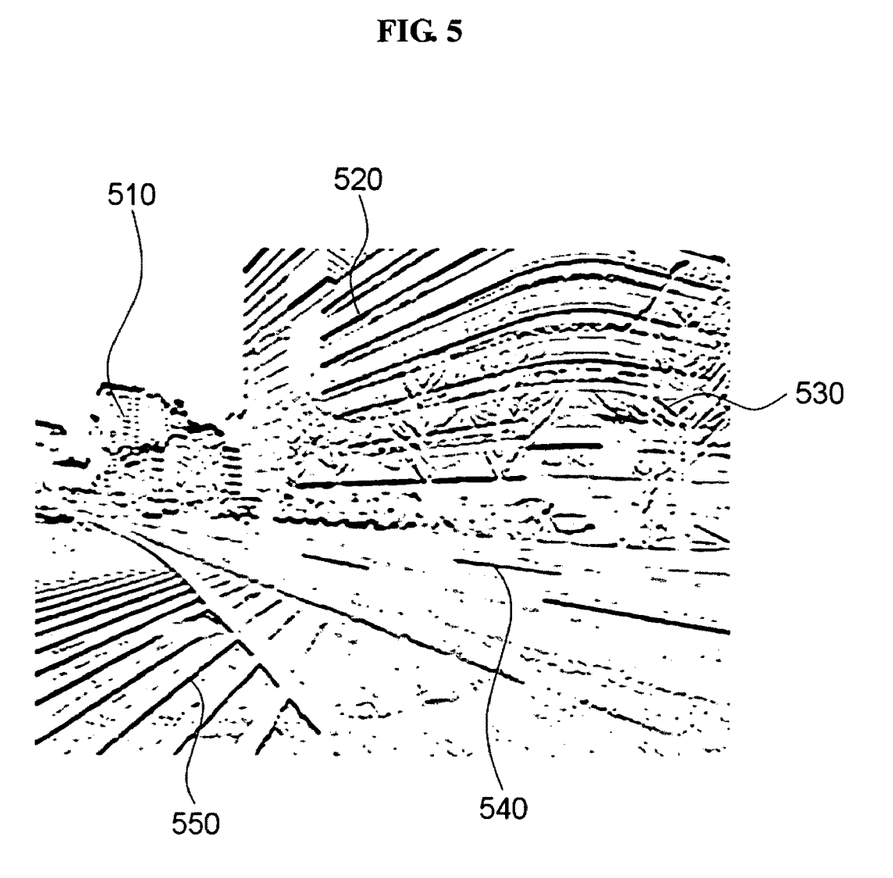
FIG. 5 illustrates an example of an image of a plurality of horizontal straight lines extracted from another image, for example, the image of FIG. 2, according to an embodiment of the present invention.

FIG. 5 illustrates an example image of a plurality of horizontal straight lines extracted from an image, for example, the image of FIG. 2 according to an embodiment of the present invention. A straight line 510 and a straight line 520 are horizontal straight lines belonging to a B region. However, the straight line 510 and the 520 are respectively heading towards different vanishing points. Although the straight line 530 is a straight line, the straight line 530 is extracted not from the B region, but from tree lining a street in the image of FIG. 2. A straight line 540 and a straight line 550 are straight lines extracted from a traffic lane. The straight lines 530, 540 and 550 may cause an error during an image processing which determines a ground line.

Figure 6:
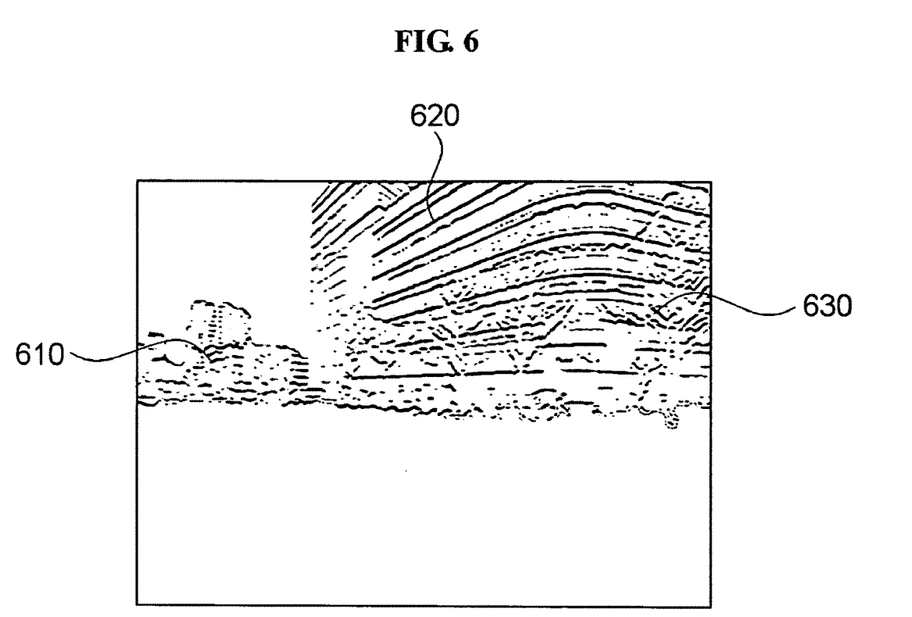
FIG. 6 illustrates an example of an image of a plurality of horizontal straight lines belonging to a building region extracted from another image, for example, the image of FIG. 5, according to an embodiment of the present invention.

FIG. 6 illustrates an example image of a plurality of horizontal straight lines belonging to a B region extracted from an image, for example, the image of FIG. 5, according to an embodiment of the present invention. For example, the GBS map of FIG. 3 and the image of FIG. 5 are compared in operation 430 of FIG. 4. Portions corresponding to the regions 310 and 330 of FIG. 3 are filtered out from the image of FIG. 5. Thus, only a portion corresponding to the region 320 remain in FIG. 6. Thus, the straight lines 540 and 550 corresponding to the regions 310 and 330 from the straight lines 510 to 550 in FIG. 5 are eliminated and only the straight lines 510, 520, and 530 respectively remain as straight lines 610, 620, and 630 in FIG. 6.

Figure 7:
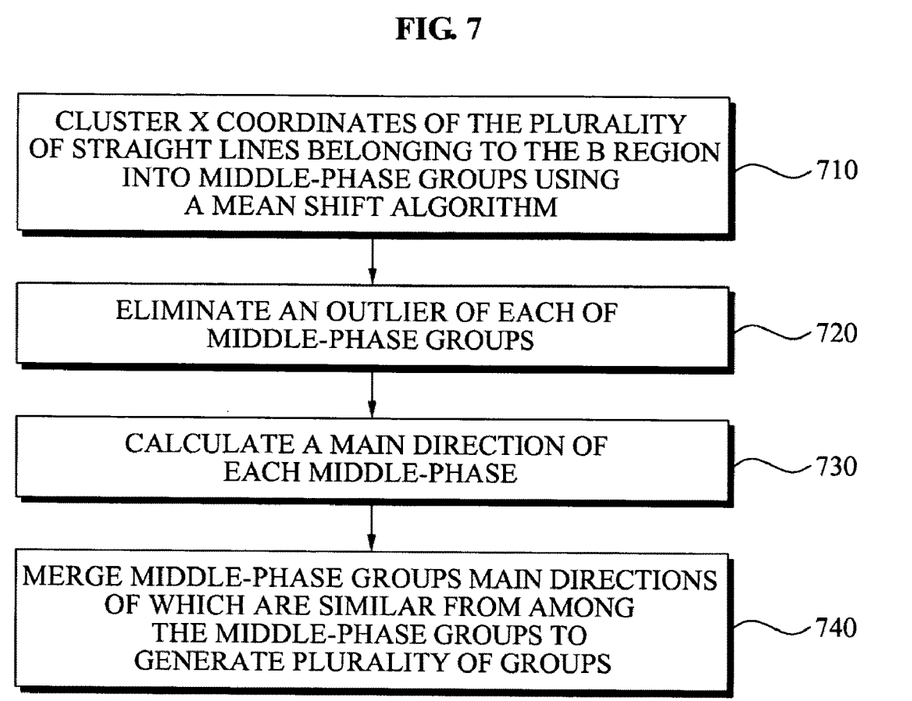
FIG. 7 illustrates a flowchart of a process of clustering the plurality of horizontal straight lines belonging to the building region, for example, the building region of FIG. 6, into a plurality of groups according to an embodiment of the present invention.

FIG. 7 illustrates a flowchart of a process of clustering the plurality of horizontal straight lines belonging to the B region of an image, for example, the image of FIG. 6, into a plurality of groups according to an embodiment of the present invention.

In operation 710, x coordinates of the plurality of straight lines belonging to the B region are clustered into middle-phase groups using a mean shift algorithm (MSA). The MSA, which is a method for searching a gradient in a probability distribution of a feature value using a repeated performance, statistically effectively finds a peak (or a mode).

In operation 720, an outlier of each of the middle-phase groups is eliminated. According to an embodiment, the outlier is eliminated through a Random Sample Consensus (RANSAC) algorithm.

In operation 730, a main direction of each middle-phase is calculated. A vector calculation for a plurality of straight lines in each group is performed, so that the main direction of the middle-phase is calculated.

In operation 740, middle-phase groups having similar main directions are merged, thereby generating a plurality of groups. If another clustering using the MSA with the main direction calculated in operation 730 is performed, the plurality of groups in a bigger unit are generated by merging the middle-phase groups with similar main directions.

Figure 8:
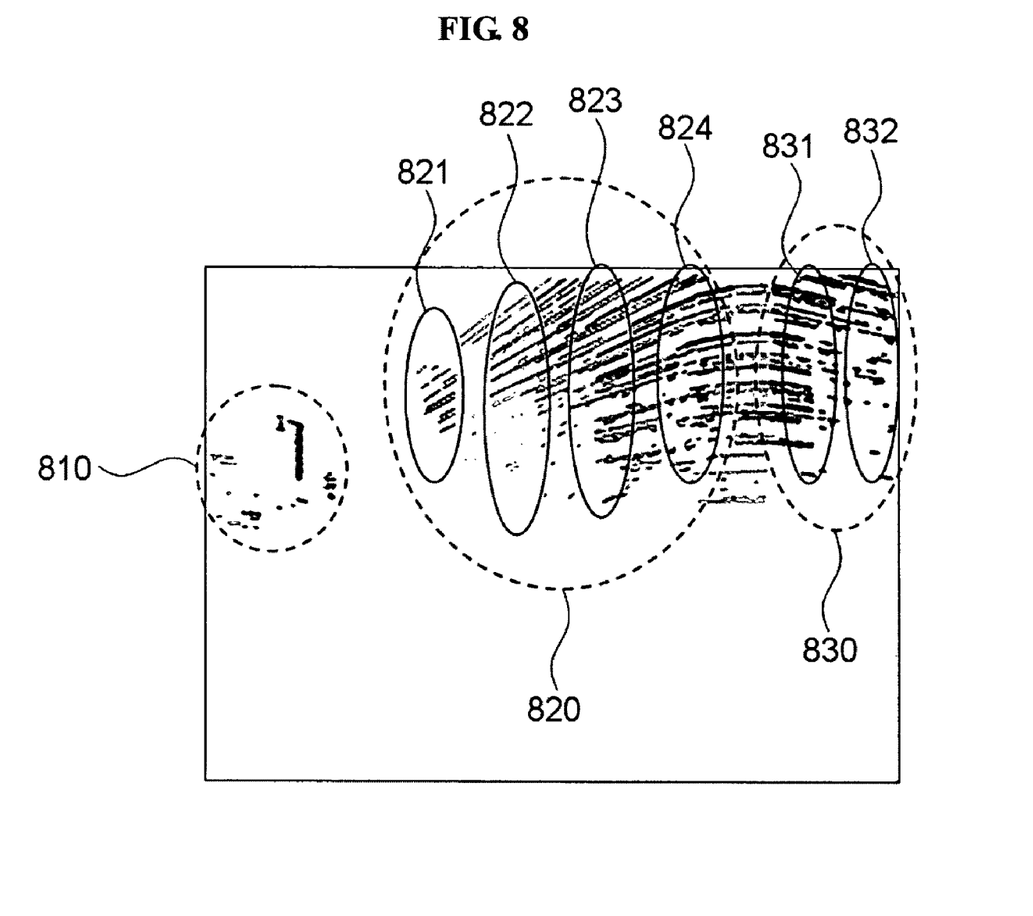
FIG. 8 illustrates an example of a plurality of groups clustered from an image, for example, the image of FIG. 6, according to an embodiment of the present invention.

FIG. 8 illustrates an example of a plurality of groups clustered from an image, for example, the image of FIG. 6, according to an embodiment of the present invention. A cluster 810, cluster 820, cluster 821, cluster 822, cluster 823, cluster 824, cluster 831, and cluster 832 are groups of horizontal straight lines which have the same vanishing point. According to an embodiment of the present invention, several clusters with similar main directions can be merged into another single cluster. Since the clusters 821 to 824 have main directions similar to each other, they may be merged into the cluster 820. In the same manner, the clusters 831 and 832 may be merged into the cluster 830. Thus, the plurality of groups, the cluster 810, cluster 820, and cluster 830 exist in the example image.

Figure 9A:
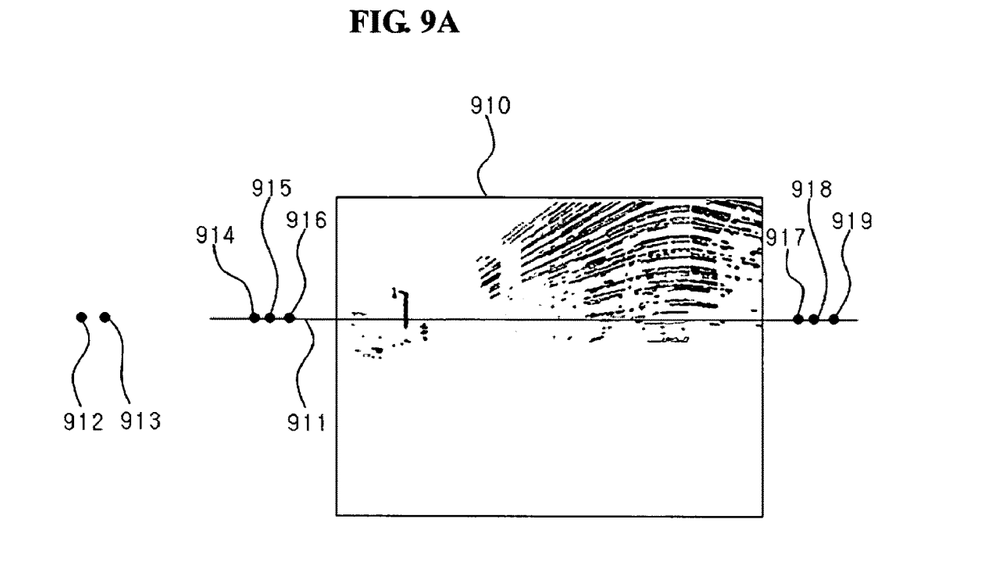
FIG. 9A illustrates an example of an image of a vanishing point of each of the plurality of groups, for example, the plurality of groups of FIG. 8, according to an embodiment of the present invention.

FIG. 9A illustrates an image of a vanishing point of each of the plurality of groups in an image, for example, the image of FIG. 8, according to an embodiment of the present invention. An image 910 shows a process of obtaining a vanishing point. Vanishing points 914, 915, and 916 are extracted from the plurality of straight lines in the cluster 820 of FIG. 8. Also, vanishing points 917, 918, and 919 are extracted from the plurality of straight lines in the cluster 830. The vanishing points 912 and 913 are vanishing points of outliers which were not eliminated from the cluster. Therefore, the vanishing points 912 and 913 of the outliers are eliminated. A vanishing point of an inlier is used for extracting a final vanishing point. Also, since the plurality of straight lines in the cluster 810 of FIG. 8 are parallel, there is no vanishing point for that cluster. As shown in FIG. 9A, the vanishing points 912, 913, 914, 915, 916, 917, 918, and 919, may all lie along the same line 911.

Figure 9B:
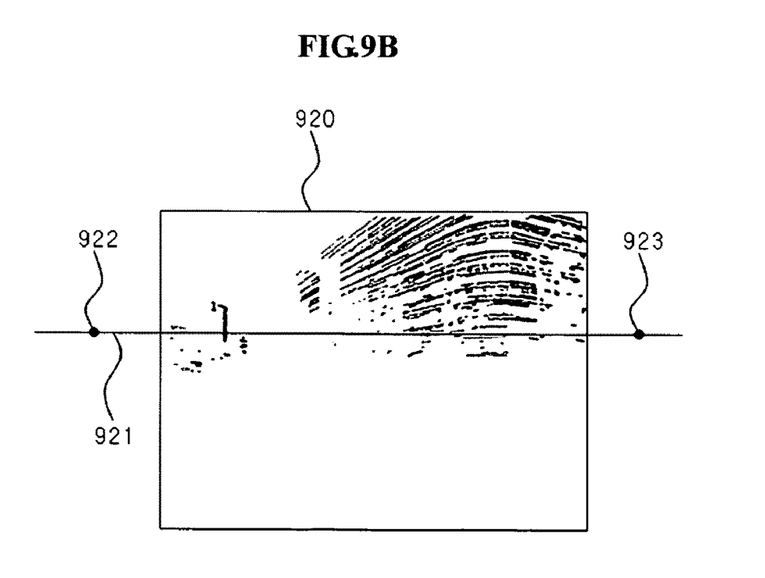
FIG. 9B illustrates an example of an image of a final vanishing point of each of the plurality of groups, for example, the plurality of groups of FIG. 8, according to an embodiment of the present invention.

FIG. 9B illustrates an image of a final vanishing point of each of the plurality of groups in an image of FIG. 8 according to an example embodiment of the present invention. The vanishing points 912 and 913 of an outlier in FIG. 9A are eliminated. A vanishing point 922 is extracted by averaging the vanishing points 914, 915, and 916 in FIG. 9A. A vanishing point 923 is an average of the vanishing points 917, 918, and 919. Thus, the final vanishing points of the sample image are the vanishing points 922 and 923. As shown in FIG. 9B, the final vanishing points may lie along the same line 921.

Figure 10A:
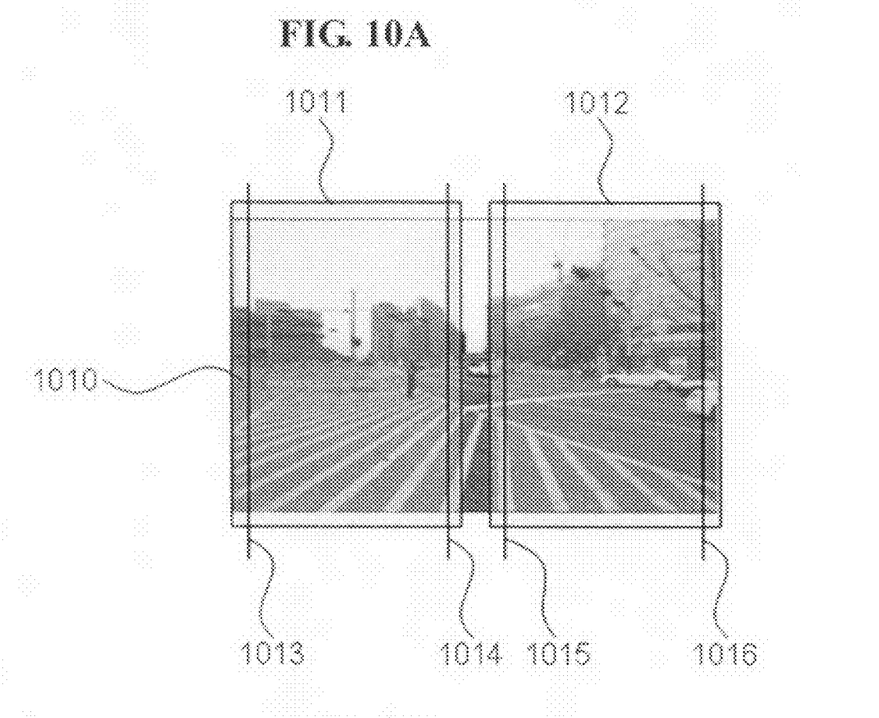
FIG. 10A illustrates an example of an image of selected edges of a plurality of groups to determine a vertical boundary line between the plurality of groups according to an embodiment of the present invention.

FIG. 10A illustrates an image of selected edges of a plurality of groups to determine a vertical boundary line between the plurality of groups according to an embodiment of the present invention. Clusters 1011 and 1012 are in the sample image. Since a plurality of straight lines in the cluster 1011 are parallel with each other, there is a no vanishing point. A plurality of straight lines in the cluster forms a single vanishing point in a left side of the cluster 1012.

In an image 1010, 10% of a portion of edges of each cluster are selected. A straight line 1013 and a straight line 1014 respectively indicate a straight line marking the left 10% edge and a straight line marking the right 10% edge of the cluster 1011. Also, a straight line 1015 and a straight line 1016 respectively indicate a straight line marking the left 10% edge and a straight line marking the right 10% edge of the cluster 1012. According to one or more embodiments, the 10% edge may be replaced with another value.

Figure 10B:
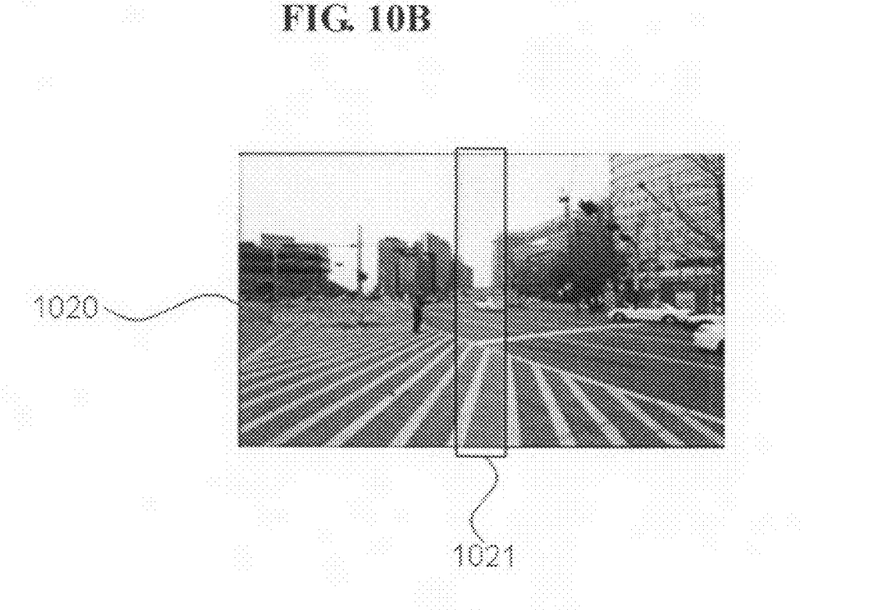
FIG. 10B illustrates an example of an image of a selected region between a plurality of groups to determine a vertical boundary line between the plurality of groups according to an embodiment of the present invention.

FIG. 10B illustrates an image of a region between the clusters 1011 and 1012 (FIG. 10A) selected to determine a vertical boundary line between the plurality of groups according to an embodiment of the present invention. In an image 1020, a region 1021 between the clusters 1014 and 1015 in FIG. 1A, is selected. Each of the clusters 1011 and 1012 (FIG. 10A) has a ground line and a portion where the ground line curve is included somewhere within the region 1021.

Figure 10C:
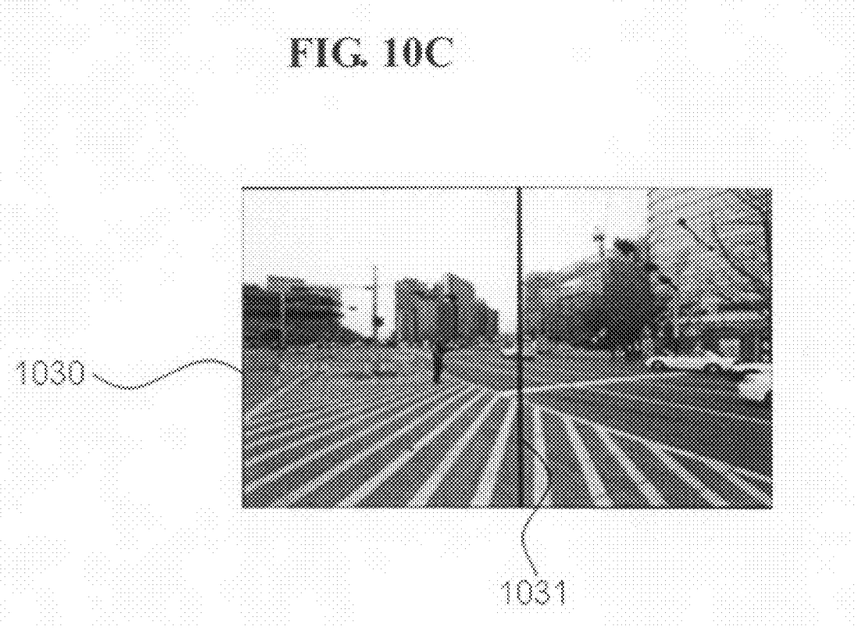
FIG. 10C illustrates a sample image of a result from determining a vertical boundary line between a plurality of groups according to an embodiment of the present invention.

FIG. 10C illustrates a sample image of a result of determining a vertical boundary line between a plurality of groups according to an embodiment of the present invention.

In an image 1030, a boundary line 1031 corresponds to a vertical boundary line, determined in operation 160 of FIG. 1, between the plurality of groups. According to an embodiment, the boundary line 1031 is the longest straight line from among vertical straight lines in the region 1021 of FIG. 10B.

Figure 11:
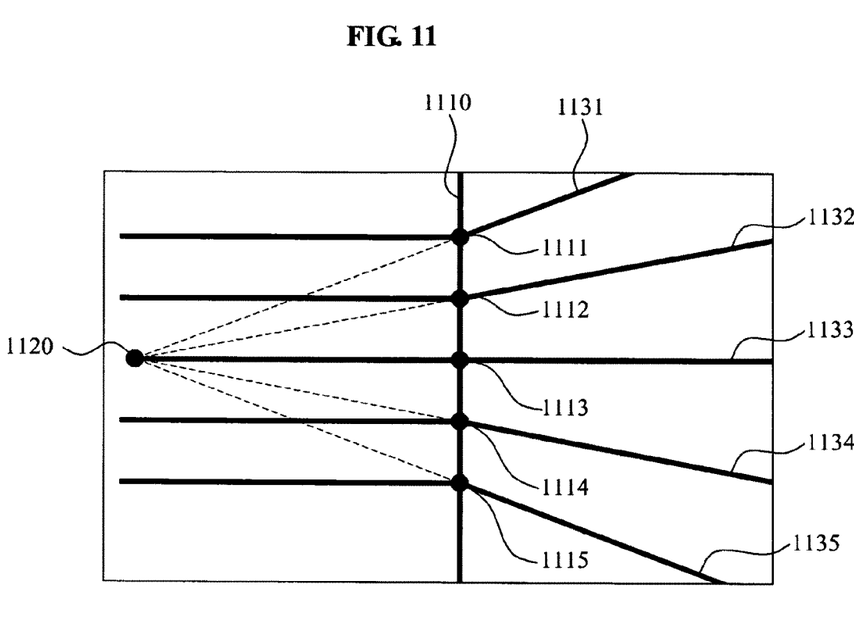
FIG. 11 illustrates an example of a plurality of ground line candidates, for example, a plurality of ground line candidates of the image of FIG. 10, according to an embodiment of the present invention.

FIG. 11 illustrates an example of a plurality of ground line candidates of an image, for example, the image of FIG. 10, determined in operation 170 of FIG. 1, according to an embodiment of the present invention. A boundary line 1110 corresponds to a boundary line 1031 of FIG. 10. A ground line candidate 1131 which passes through a point 1111 in the boundary line 1110 and the clusters 1011 and 1012 of FIG. 10 is determined. Since there is no vanishing point of the cluster 1011, to the left of point 1111 the ground line candidate 1131 is horizontal and to the right of point 1111 the ground line candidate slopes in a direction heading toward a vanishing point 1120 of the cluster 1012. Also, ground line candidates 1132, 1133, 1134, and 1135 are determined respectively for points 1112, 1113, 1114, and 1115 in the boundary line 1110.

Figure 12:
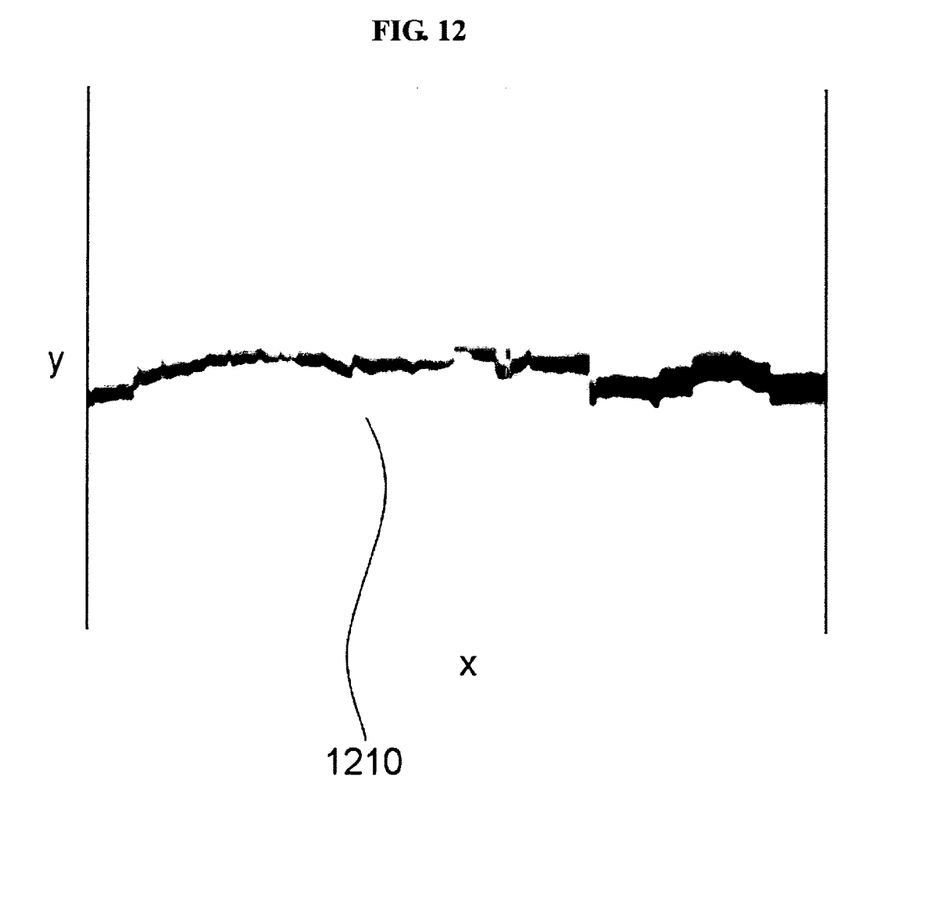
FIG. 12 illustrates an image of determining a certain band for a central-line of which is a boundary between a G region and other regions in a GBS map of the image according to an embodiment of the present invention.

FIG. 12 illustrates an image of determining a certain band having a central-line of which is a boundary between a G region and other regions according to an embodiment of the present invention. A certain band 1210 having a central-line of which, for example, is a boundary 340 of FIG. 3, is determined. According to an embodiment, a predetermined number of pixels added, either in a positive or negative y coordinate direction, to each pixel of the boundary 340 are determined as the certain band 1210.

Figure 13:
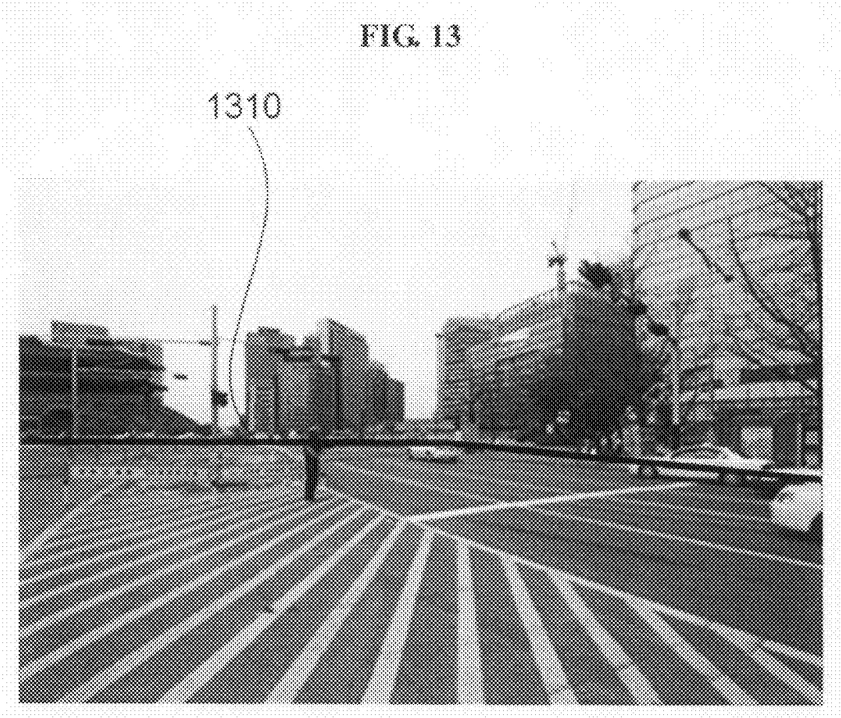
FIG. 13 illustrates an example of an image resulting from determining a ground line from an image, for example, the image of FIG. 10, according to an embodiment of the present invention.

FIG. 13 illustrates an image of a result of determining a ground line from an image, for example, the image of FIG. 10, according to an embodiment of the present invention. A ground line 1310 is a ground line of the sample image of FIG. 10. The ground line candidates (1131 to 1135) of FIG. 11 are compared with the certain band of FIG. 12, and then a candidate most of which is within the certain band 1210 from among the ground line candidates (1131 to 1135) is determined as the ground line 1310. According to an embodiment, the determining of the ground line 1310 of the image depends on to what degree each of the plurality of ground line candidates (1131 to 1135) is within the certain band 1210. This determining includes calculating a number of pixels of each of the plurality of ground line candidates (1131 to 1135) that cross the certain band 1210, and determining a ground line that has the greatest number of pixels that lie within the certain band as the ground line 1310 of the image.

The image processing method according to the above-described embodiments of the present invention may be recorded in computer-readable media including program instructions to implement various operations embodied by a computer. The media may also include, alone or in combination with the program instructions, data files, data structures, etc. Examples of computer-readable media include magnetic media such as hard disks, floppy disks, and magnetic tape; optical media such as CD ROM disks and DVD; magneto-optical media such as floptical disks, and hardware devices that are specially configured to store and perform program instructions, such as read-only memory (ROM), random access memory (RAM), flash memory, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of determining a ground line of an image, comprising:
   determining a plurality of ground line candidates from the image;
   determining a certain band having a central-line being a boundary between a ground (G) region and other regions in a Ground Building Sky (GBS) map of the image; and
   determining the ground line of the image by selecting a ground line candidate, among the plurality of ground line candidates, having the greatest number of points lying within the certain band.

2. The method of claim 1, further comprising:
   generating the GBS map of the image from the image.

3. The method of claim 1, further comprising:
   detecting a plurality of horizontal straight lines belonging to a B region of the image,
   wherein the determining of the plurality of ground line candidates uses the plurality of horizontal straight lines.

4. The method of claim 3, wherein the detecting comprises:
   extracting a plurality of straight lines from the image;
   detecting a plurality of horizontal straight lines from among the plurality of straight lines; and
   selecting the plurality of horizontal straight lines belonging to the B region from among the plurality of horizontal straight lines.

5. The method of claim 4, wherein the selecting the plurality of horizontal straight lines belonging to the B region comprises:
   comparing the B region in the GBS map of the image with the plurality of horizontal straight lines; and
   selecting the plurality of horizontal straight lines belonging to the B region, based on the comparing.

6. The method of claim 3, further comprising:
   clustering the plurality of horizontal straight lines into a plurality of groups,
   wherein the determining of the plurality of ground line candidates is based on the clustered plurality of horizontal straight lines.

7. The method of claim 6, wherein the clustering comprises:
   clustering the plurality of horizontal straight lines into middle-phase groups, based on x coordinates of the plurality of horizontal straight lines, by using a mean shift algorithm;
   eliminating an outlier of each of the middle-phase groups;
   calculating a main direction of each of the middle-phase groups; and
   generating the plurality of groups by merging the middle-phase groups having similar main directions.

8. The method of claim 6, further comprising:
   determining a vanishing point of each of the plurality of groups.

9. The method of claim 8, further comprising:
   determining a vertical boundary line between the plurality of groups.

10. The method of claim 9, wherein the determining of the plurality of ground line candidates further comprises:
    detecting a straight line that passes through a plurality of points of the vertical boundary line and the vanishing point of each of the plurality of groups.

11. The method of claim 1, wherein the determining the certain band determines the certain band that has a predetermined width in a y coordinate direction, from a pixel of the boundary between the G region and the other regions in the GBS map.

12. The method of claim 1, wherein the determining of the ground line of the image comprises:
    calculating a number of pixels of each of the plurality of ground line candidates that lie within the certain band; and
    determining the ground line candidate that has the greatest number of pixels lying within the certain band as the ground line of the image.

13. A computer readable recording device storing a program for implementing a method of any one of claims 1-12.

* * * * *